United States Patent Office 3,366,651
Patented Jan. 30, 1968

3,366,651
6-CHLORO-6-DEHYDRO-17α-(LOWER ALKYL) PROGESTERONES
Yvon Lefebvre, Pierrefonds, Quebec, Canada, assignor to American Home Products Corporation, New York, N.Y., a corporation of Delaware
No Drawing. Continuation-in-part of application Ser. No. 195,399, May 17, 1962. This application Nov. 19, 1962, Ser. No. 238,794
5 Claims. (Cl. 260—397.3)

This application is a continuation-in-part of my co-pending patent application Ser. No. 195,399, filed May 17, 1962, and now abandoned.

This invention relates to orally-active progestational agents and to methods by which they may be prepared, as well as to methods for the preparation of certain intermediates useful in the synthesis of said orally-active progestational agents.

More specifically, my invention relates to 6-chloro-6-dehydro-17α-(lower alkyl)progesterones, and in particular to the compounds 6-chloro-6-dehydro-17α-methylprogesterone and 6-chloro-6-dehydro-17α-ethylprogesterone, as well as to methods by which these orally-active compounds may be prepared. It is also concerned with certain intermediate compounds, and their preparation, useful in the manufacture of these progestational agents.

Some of the compounds of this invention are useful as orally-active progestational agents of unusually high potency, these compounds being useful for maintaining pregnancy, and further, being substantially free from objectionable side-effects. As orally-active progestational agents the compounds of my invention may be administered in dosage forms such as tablets, capsules, or the like, these containing from 5 to 50 milligrams of the active compound per dosage form, the active agent being present in such dosage forms along with excipients such as lactose, starch, magnesium stearate, as well as such other substances as are commonly used in the formulation of dosage forms for oral administration.

The orally-active 6-chloro-6-dehydro-17α-(lower alkyl)-progesterones may be represented generically by the following formula:

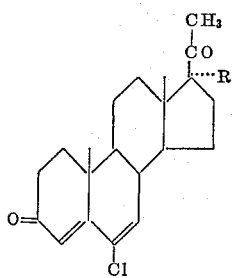

wherein R is a straight chain lower alkyl radical containing from one to four carbon atoms.

A preferred method for the preparation of these compounds involves first treating a 17α-(lower alkyl)progesterone, the preparation of which has been described by R. Deghenghi and R. Gaudry, Tetrahedron Letters No. 11, p. 489 (1962), with chloranil to yield the corresponding 6-dehydro-17α-(lower alkyl)progesterone.

Alternatively, these 6-dehydro-17α-(lower alkyl)progesterones may be secured by treating a 17α-(lower alkyl) pregnenolone, the preparation of which has also been described in the publication cited above, with aluminum isopropoxide and a quinone, preferably benzoquinone or chloranil, under the conditions commonly known as the modified Oppenauer reaction as described in "Organic Reactions," vol. VI, p. 236. The intermediate compound thus produced, i.e. the corresponding 6-dehydro-17α-(lower alkyl)progesterone, may then be treated with a suitable oxidizing agent, preferably with a peracid such as e.g. monoperphthalic acid, to yield the corresponding 17α-(lower alkyl)-6α,7α-oxidoprogesterone. Treatment of the latter compounds with hydrogen chloride opens the epoxide ring with concomitant elimination of the elements of water. In this way, the desired end product, the corresponding 6-chloro-6-dehydro-17α-(lower alkyl)progesterone, is secured.

These procedures may be schematically illustrated as follows:

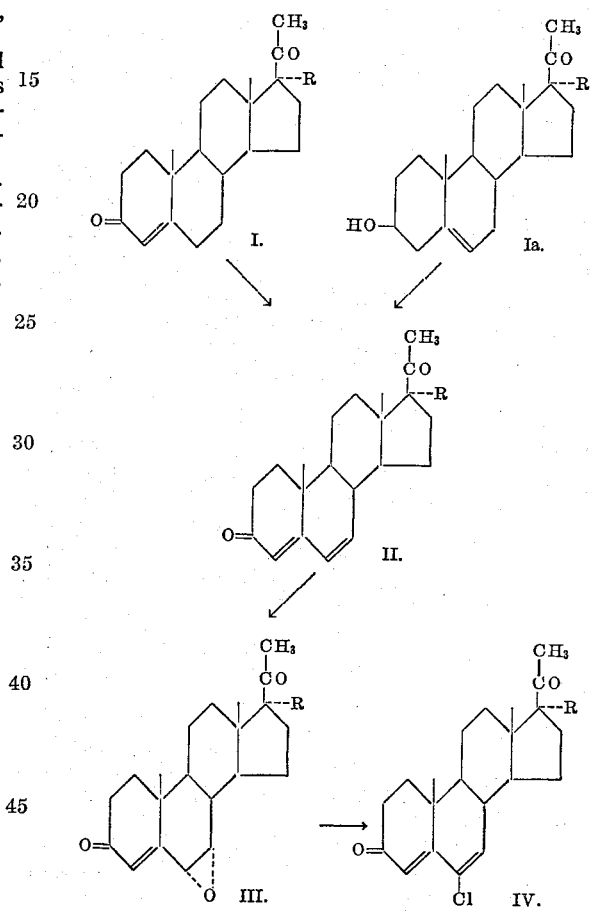

In this schematic representation, R denotes a straight chain lower alkyl radical containing from 1–4 carbon atoms.

The following examples illustrate my invention.

EXAMPLE 1

*6-dehydro-17α-(lower alkyl)progesterones*

A mixture of 9.85 g. of 17α-methylprogesterone, 10 cc. of glacial acetic acid, and 9.85 g. of chloranil in 250 cc. of tertbutanol is refluxed gently under nitrogen for sixteen hours. The cold solution is evaporated to dryness and the residue is taken up in ether. Some unreacted chloranil is filtered and the ethereal solution is thoroughly washed with 5% KOH solution. When no more color is extracted, the ether is washed with water to neutrality, dried over magnesium sulfate, and evaporated to dryness. The residue is 6-dehydro-17α-methylprogesterone which shows in the U.V. a maximum of absorption at 287 mμ with an extinction coefficient of 26,800. The pure compound melts at 148–150° C.

Alternatively, a mixture of 500 mg. of 17α-methyl-pregnenolone (Ia) and 3.0 of benzoquinone in 25 cc. of toluene is distilled until 5 cc. of the solvent have been removed; then 500 mg. of aluminum isopropoxide are added and the solution is refluxed for one hour. The reaction mixture is diluted with water and is subjected to a steam distillation until all the quinone has sublimed. The residual solution is acidified with 10% HCl and extracted with ether. The ether solution is washed with 10% KOH until no further color is eluted and then with water to neutrality. The residue is a resin which is purified by chromatography on alumina. Elution with hexane in benzene yielded 6-dehydro-17α-methylprogesterone (II), M.P. 142–147° C., λ max. 287 mμ, characteristic of a Δ$^{4,6}$-3-ketone system, identical with an authentic sample.

In the same manner, an amount of 15.0 grams of 17α-ethylpregnenolone is dissolved in 550 millilitres of toluene and the mixture refluxed in the presence of 150 millilitres of cyclohexanone, 15 grams of aluminum isopropoxide and 15 grams of chloranil for one hour. The compound 17α-ethylpregnenolone had been previously prepared in accordance with the process described in Tetrahedron Letters No. 11, p. 489 (1962), cited above.

Working up in accordance with the disclosed procedure results in a residue, which in chromatographed on neutral alumina. The compound 6-dehydro-17α-ethylprogesterone is eluted in the petroleum ether-benzene fractions, M.P. 170–174° C., λ max. 287; ε 26,000.

In a similar manner, 17α-propylpregnenolone or 17α-propylprogesterone, are converted to 6-dehydro-17α-propylprogesterone, and 17α-butylpregnenolone or 17α-butylprogesterone, yield 6-dehydro-17α-butylprogesterone.

EXAMPLE 2

*17α-lower alkyl)-6α,7α-oxidoprogesterones*

A mixture of 5.195 g. of 6-dehydro-17α-methylprogesterone (II) dissolved in 450 cc. of methylene chloride and 360 cc. of 0.429 N ethereal monoperphthalic acid solution is left at room temperature for three days. A precipitate forms, which is water soluble. The organic solution is washed with water, NaHCO$_3$ and water, dried and evaporated to dryness. The residue is 4.5 g. of a pale yellow resin. Purification by chromatography on alumina gives the pure 17α-methyl-6α,7α-oxidoprogesterone, M.P. 172–173° C. U.V. absorption λ max. 241, 327 mμ, extinction coefficients: 15,800, 630.

In the same manner, 6-dehydro-17α-ethylprogesterone in the amount of 2.0 grams in 50 millilitres of dry methylene chloride is treated with 95 millilitres of a 0.364 N solution of monoperphthalic acid in ether. The treatment is carried out at room temperature for 65 hours.

The usual working up yields 1.9 grams of a crystalline residue from which 17α-ethyl-6α,7α-oxidoprogesterone may be isolated by crystallization from ether, M.P. 215–220° C. (dec.).

In a similar manner, 17α-propyl-6α,7α-oxidoprogesterone is obtained from 6-dehydro-17α-propylprogesterone, and 17α-butyl-6α,7α-oxidoprogesterone is secured from 6-dehydro-17α-butylprogesterone.

EXAMPLE 3

*6-chloro-6-dhydro-17-(lower alkyl)progesterones*

Dry hydrochloric acid is bubbled through a solution of 1.26 g. of 17α-methyl-6α,7α-oxidoprogesterone in 50 cc. of glacial acetic acid, until the solution is saturated. The mixture is then left at room temperature for four hours. The mixture is poured on ice. The resulting solid is filtered and washed free of acid. It is then dissolved in methylene chloride. The organic solution is dried and evaporated to dryness, leaving a pale yellow resin. Purification by chromatography and crystallization gives pure 6-chloro-6-dehydro-17α-methylprogesterone, M.P. 125–126° C. The maximum of absorption is at 288 mμ with an extinction coefficient of 23,000.

In the same manner, a solution of 670 milligrams of 17α-ethyl-6α,7α-oxidoprogesterone in 25 millilitres of acetic acid is saturated with dry hydrogen chloride and allowed to stand at room temperature for 16 hours.

Working up yields a residue, from which 6-chloro-6-dehydro-17α-ethylprogesterone is isolated by crystallization from ether, M.P. 177–179° C., [α]$_D^{24}$+30.9 in chloroform. Analysis confirmed its empiric formula.

In the ultra-violet spectrum the new compound shows an absorption maximum at 288 mμ and an extinction coefficient of 24,800.

In a similar manner, 17α-propyl-6α,7α-oxidoprogesterone is converted to 6-chloro-6-dehydro-17α-propylprogesterone, and 17α-butyl-6α,7α-oxidoprogesterone yields 6-chloro-6-dehydro-17α-butylprogesterone.

I claim:
1. Compounds of the formula:

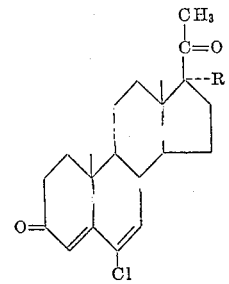

wherein R is a straight chain lower alkyl containing from one to four carbon atoms.

2. 6-chloro-6-dehydro-17α-methylprogesterone.
3. 6-chloro-6-dehydro-17α-ethylprogesterone.
4. A compound of the formula

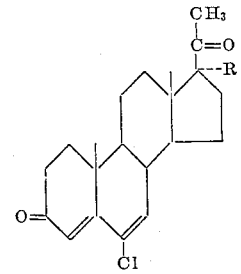

wherein R is selected from the group consisting of methyl, ethyl, and propyl.

5. The compound 6-chloro-17α-propylpregna-4,6-diene-3,20-dione.

References Cited

UNITED STATES PATENTS

| | | | |
|---|---|---|---|
| 2,738,348 | 3/1956 | Colton | 260—239 |
| 2,998,434 | 8/1961 | Ringold et al. | 260—397 |
| 3,076,823 | 2/1963 | Ringold et al. | 260—397 |

FOREIGN PATENTS

| | | |
|---|---|---|
| 832,752 | 2/1952 | Germany. |
| 1,075,114 | 2/1960 | Germany. |

OTHER REFERENCES

Fieser et al., "Steroids," 1959, pp. 563–564, Reinhold Publishing Corp., New York, New York.

LEWIS GOTTS, *Primary Examiner.*

J. BROWN, *Assistant Examiner.*